United States Patent
Schultz et al.

(10) Patent No.: US 8,999,117 B2
(45) Date of Patent: Apr. 7, 2015

(54) PROCESS AND SYSTEM FOR HEATING OR COOLING STREAMS FOR A DIVIDED DISTILLATION COLUMN

(75) Inventors: Michael A. Schultz, Des Plaines, IL (US); Xin X. Zhu, Des Plaines, IL (US); Jibreel A. Qafisheh, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 1483 days.

(21) Appl. No.: 12/398,070

(22) Filed: Mar. 4, 2009

(65) Prior Publication Data
US 2010/0224536 A1 Sep. 9, 2010

(51) Int. Cl.
*B01D 3/32* (2006.01)
*B01D 3/14* (2006.01)

(52) U.S. Cl.
CPC *B01D 3/14* (2013.01); *B01D 3/141* (2013.01); *C10G 2400/02* (2013.01)

(58) Field of Classification Search
USPC .......................................... 202/159, 161, 270
See application file for complete search history.

(56) References Cited

U.S. PATENT DOCUMENTS

| | | | |
|---|---|---|---|
| 5,914,012 A | 6/1999 | Kaibel et al. | |
| 6,395,950 B1 | 5/2002 | Rice | |
| 6,472,578 B1 | 10/2002 | Rice | |
| 6,551,465 B1 | 4/2003 | Van Zile et al. | |
| 6,558,515 B1 | 5/2003 | Steacy | |
| 6,645,350 B1 | 11/2003 | Steacy | |
| 6,762,334 B1 | 7/2004 | Stewart et al. | |
| 7,249,469 B2 | 7/2007 | Porter | |
| 7,267,746 B1 | 9/2007 | Harris et al. | |
| 7,339,088 B1 | 3/2008 | O'Brien et al. | |
| 7,462,277 B2 | 12/2008 | Adrian et al. | |
| 2005/0121303 A1 | 6/2005 | de Graauw et al. | |
| 2005/0199482 A1 | 9/2005 | Heida | |
| 2005/0250965 A1 | 11/2005 | Bassler et al. | |
| 2006/0137967 A1 | 6/2006 | Kister et al. | |
| 2007/0043217 A1 | 2/2007 | Siegert et al. | |

FOREIGN PATENT DOCUMENTS

| | | | |
|---|---|---|---|
| WO | WO-2005/046831 A1 | 5/2005 | |
| WO | WO-2008/091317 A2 | 7/2008 | |

OTHER PUBLICATIONS

R. Agrawal, Multicomponent Distillation Columns with Partitions and Multiple Reboilers and Condensers, 40 Ind. Eng. Chem. Res. 4258-4266 (2001).*

(Continued)

*Primary Examiner* — Randy Boyer

(57) ABSTRACT

One exemplary embodiment can be a system for separating a plurality of naphtha components. The system can include a column, an overhead condenser, and a side condenser. Generally, the column includes a dividing imperforate wall with one surface facing a feed and another surface facing at least one side stream. Typically, the wall extends a significant portion of the column height to divide the portion into at least two substantially vertical, parallel contacting sections. Typically, the overhead condenser receives an overhead stream including a light naphtha from the column. Usually, a side condenser receives a process stream from the column and returns the stream to the column to facilitate separation. A cooling stream may pass through the overhead condenser and then the side condenser.

20 Claims, 3 Drawing Sheets

(56) References Cited

OTHER PUBLICATIONS

Poth, Abstract of Minimal Energy Requirements of Dividing Wall Columns, 2004.

Christiansen et al., Complex Distillation Arrangements: Extending the Petlyuk Ideas, Computers and Chemical Engineering, May 1997, vol. 21, No. Suppl. 1, pp. S237-S242.

Ivanescu et al., Dividing Wall Column—a New Challenge for Separation Systems, 2004, p. 4.

Lestak et al., Advanced Distillation Saves Energy and Capital, Chemical Engineering, Jul. 1997, vol. 104, No. 7, pp. 72-76.

Mueller et al., Reactive Distillation in a Dividing Wall Column: Rate-Based Modeling and Simulation, Industrial and Engineering Chemistry Research, 2007, vol. 46, No. 11, pp. 3709-3719.

Mueller et al., Rate-Based Analysis of Reactive Distillation Sequences with Different Degrees of Integration, Chemical Engineering Science, 2007, vol. 62, No. 24, pp. 7327-7335.

Muralikrishna et al., Development of Dividing Wall Distillation Column Design Space for a Specified Separation, Chemical Engineering Research and Design, Mar. 2002, vol. 80, No. 2, pp. 155-166.

Poth et al., Minimal Energy Requirements of Dividing-Wall Columns, Chemie-Ingenieur-Technik, 2004, vol. 76, No. 12, pp. 1811-1814.

Serra et al., Controllability of Different Multicomponent Distillation Arrangements, Apr. 16, 2003, vol. 42, No. 8, pp. 1773-1782.

Serra et al., Dynamic Behavior and Controllability Issues in the Design and Operation of the Dividing Wall Column, Czech Society of Chemical Engineering 13th International Chemical and Process Engineering CHISA 98 Congress, 1998, vol. N.F1.5, p. 20.

Slade et al., Dividing Wall Column Revamp Optimises Mixed Xylenes Production, 2006, AICHE the 2006 Spring National Meeting, Orlando, FL, p. 6.

Suphanit et al., Exergy Loss Analysis of Heat Transfer Across the Wall of the Dividing-Wall Distillation Column, Energy, 2007, vol. 32, No. 11, pp. 2121-2134.

\* cited by examiner

PROCESS AND SYSTEM FOR HEATING OR COOLING STREAMS FOR A DIVIDED DISTILLATION COLUMN

FIELD OF THE INVENTION

This invention generally relates to a divided distillation column, and condensing and heating duties relating thereto.

DESCRIPTION OF THE RELATED ART

In some instances, a dividing wall column can be more efficient for separating three or more products from a feed. Particularly, in some instances a dividing wall column can be used instead of two or more conventional distillation columns. Thus, the single dividing wall column can provide energy and capital savings as compared to a plurality of conventional columns that are utilized to obtain the same separation.

However, an individual dividing wall column typically requires all of the heating supplied at a maximum temperature and all of the cooling supplied at a minimum temperature. Generally, providing these conditions at high and low temperatures requires expensive utilities, such as high pressure steam, available in a refinery or a chemical manufacturing facility. On the other hand, a series of conventional distillation columns can have intermediate duties supplied, which can be provided by lower cost utilities, such as medium pressure steam, which can be less expensive. Consequently, efficiently utilizing heating and/or cooling streams to obtain the requisite duty requirements of a dividing wall column would be highly desirable.

SUMMARY OF THE INVENTION

One exemplary embodiment can be a system for separating a plurality of naphtha components. The system can include a column, an overhead condenser, and a side condenser. Generally, the column includes a dividing imperforate wall with one surface facing a feed and another surface facing at least one side stream. Usually, the wall extends a significant portion of the column height to divide the portion into at least two substantially vertical, parallel contacting sections. Typically, the overhead condenser receives an overhead stream including a light naphtha from the column. Usually, a side condenser receives a process stream from the column and returns the stream to the column to facilitate separation. A cooling stream may pass through the overhead condenser and then the side condenser.

Another embodiment can be a system for separating a plurality of naphtha components that may include a first column and a second column. Generally, the first column includes a dividing imperforate wall with one surface facing a feed and another surface facing a side stream, a reboiler, and a side reboiler. Usually, the wall extends a significant portion of the column height to divide the portion into at least two substantially vertical, parallel contacting sections. Typically, the second column is non-divided and communicates with the first column so as to provide a feed to or receive a feed from the first column. A heating stream can pass through the reboiler and the side reboiler.

Yet a further embodiment may be a process for utilizing streams for a plurality of vessels communicating with a divided distillation column. The process can include passing a heating stream through a reboiler and the same or a different heating stream through a side reboiler to reduce the duty required in the reboiler of the divided distillation column. Typically, the divided distillation column produces at least two of a light naphtha, a medium naphtha, an aromatic naphtha, and a heavy naphtha.

Thus, the embodiments disclosed herein can provide mechanisms for efficiently providing increased reboiling and condensing duties. As an example, a stream can be withdrawn from the column to a side reboiler, and utilizing a lower temperature steam or a process stream can reduce the amount of high temperature steam required for a bottom reboiler of the column. As a consequence, the embodiments disclosed herein can provide greater energy efficiency to further reduce the operating costs of a dividing wall column.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "dividing wall column" generally means a column including a substantially fluid tight vertical wall extending through a significant portion of the column's height and located in a central portion of the column. Thus, a central portion of the column can be divided into at least two vertical, parallel vapor-liquid contacting sections. The top and bottom of the wall terminate in the column at a point distant from the respective end of the column such that there is open communication across the column interior at the top and bottom of the dividing wall.

As used herein, the term "non-divided column" generally means a column absent a dividing wall positioned substantially vertically within the column dividing a central portion into at least two vertical, parallel vapor-liquid contacting sections.

As used herein, the term "vapor" can mean a gas or a dispersion that may include or consist of one or more hydrocarbons.

As used herein, the term "naphtha components" generally means one or more hydrocarbons with not less than about 10%, by weight, distilling below about 175° C. and not less than about 95%, by weight, distilling below about 240° C. in accordance with ASTM-D86-08.

DETAILED DESCRIPTION

Figure 1:
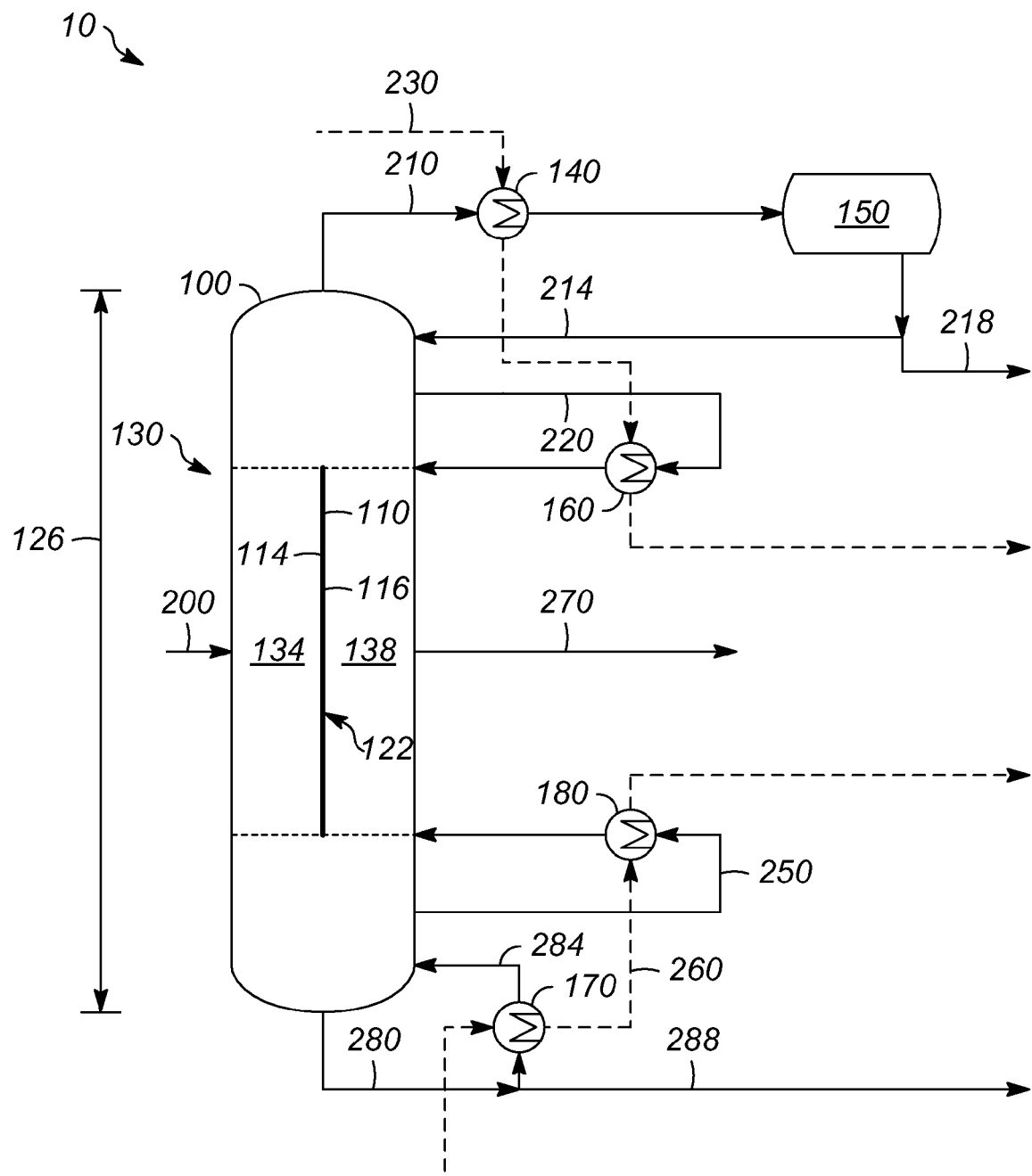
FIG. 1 is a schematic depiction of one exemplary system with a single dividing wall column producing three products.

Referring to FIG. 1, a system 10 can include a column 100, which can be a first column 100. The column 100 can have a dividing imperforate wall 110. Generally, the column 100 can receive a feed 200 and produce an overhead stream 210, at least one side stream 270, and a bottom stream 280. Typically, one surface 114 of the imperforate wall 110 can face the feed 200 while another surface 116 can face the at least one side stream 270. Typically, a significant portion 122 of the column height 126 is taken by the imperforate wall 110. Generally, the imperforate wall 110 divides the column 100 into at least two vertical, parallel contacting sections 130, namely a first contacting section 134 and a second contacting section 138.

The embodiments as described herein can utilize a dividing wall column either in combination with a non-divided column or alone to produce at least three or four products. That is, the vapor leaving the top of each divided section and the liquid leaving the bottom of each divided section can flow into a common section and be admixed. Each section often contains fractionation trays and/or packing intended to promote separation. The feed stream to the column can enter on a first receiving side of a dividing wall section of the column. Alternatively, the feed may enter near the bottom of the receiving section. Exemplary dividing wall columns are disclosed in, e.g., U.S. Pat. No. 6,551,465 B1 and U.S. Pat. No. 6,558,515 B1.

Typically, these product streams can include at least one of a light naphtha (LN), a medium naphtha (MN), an aromatics naphtha (ARN), a heavy naphtha (HN), or a combination thereof. The boiling points (BP) and true boiling points (TBP) as determined by ASTM D2892-05 are depicted in the following table:

TABLE 1

| Product Stream | BP (° C.) | TBP 10 (° C.) | TBP 90 (° C.) |
| --- | --- | --- | --- |
| LN | 20-80 | | 61 |
| MN | 80-150 | 56 | 102 |
| ARN | 150-215 | 102 | 158 |
| HN | at least about 215 | 162 | |

The column 100 can also include an overhead condenser 140, a receiver 150, a side condenser 160, a reboiler 170, and a side reboiler 180. Generally, the side condenser 160 and/or side reboiler 180 can provide additional duty capacity to cool or heat the requisite streams. Particularly, the side condenser 160 can be at a point above the feed 200 and the at least one side stream 270 and the bottom stream 280. In addition, the side reboiler 180 can provide additional duty and an intermediate temperature level below the feed and product stages. Although both a side condenser 160 and a side reboiler 180 are depicted, it should be understood that only one of these devices may be incorporated into the column 100. In addition, while a side condenser 160 is depicted above the dividing wall 110, it should be noted that the side condenser 160 could be located at a point above the feed 200 on either the feed side 200 or the product side of the wall 110, but above the side stream 270. Similarly, the side reboiler 180 could be located at a position on the feed side or product side of the wall 110 below the feed 200 and above the bottom stream 280.

The duty for the side condenser 160 can be provided by cooling utilities using any suitable fluid, such as water, or optionally be used to generate utilities such as steam or hot oil, or heating a process stream. The duty for a side reboiler 180 can be provided by utilities such as steam or hot oil, or by a process stream. Generally, it is also beneficial to use multiple reboiling stages or condensing stages with a combination of process streams and utility streams.

In this exemplary embodiment, an overhead stream 210 can pass through the overhead condenser 140 and then to the receiver 150. A portion of a light naphtha product 218 can be provided back to the column as a reflux 214. To provide additional duty, a process stream or side draw 220 can be withdrawn from the column 100, passed through the side condenser 160 to be cooled, and returned. A cooling stream 230 can pass or cascade through the overhead condenser 140 and the side condenser 160. In this manner, the cooling stream 230 can be water, such as cooling water, used first to cool the overhead stream 210 and then the side draw 220. In this manner, the same utility stream 230 can be used to cool two process streams to provide additional cooling duty for the column 100.

Below the side stream 270, which is typically a medium naphtha product, a bottom stream 280 can be withdrawn from the column. Usually, a portion is a bottom product 288, typically a heavy naphtha, with another portion as a return 284. The return 284 passes through the reboiler 170. The reboiler can use any suitable heat source, such as a furnace, high pressure stream, or another process stream. In addition, another process stream or side draw 250 can receive additional heating duty. Typically, the side draw 250 is withdrawn from the column 100 above the bottom stream 280 and below the side stream 270, passed through the side reboiler 180, and returned. The side reboiler 180 can be located any suitable elevation on the column 100, such as about half-way between the bottom of the dividing wall 110 and the bottom tray of the column 100. Similarly, as described above for the condensers 140 and 160, a heating stream 260 can pass through the reboiler 170 and then the side reboiler 180. Generally, this heating stream 260 can be any suitable heating stream, such as a high pressure steam, a medium pressure steam, a light cycle oil, or another process stream. As an example, the heating stream 260 can have an inlet temperature of the reboiler 170 of about 200-about 220° C., an outlet temperature of the reboiler 170 of about 180-about 200° C., and an outlet temperature of the side reboiler 180 of about 165-about 185° C.

As such, utilizing the heating stream 260 through both the reboiler 170 and the side reboiler 180 can allow the use of one heating stream to provide additional heat duty to the column 100.

Figure 2:
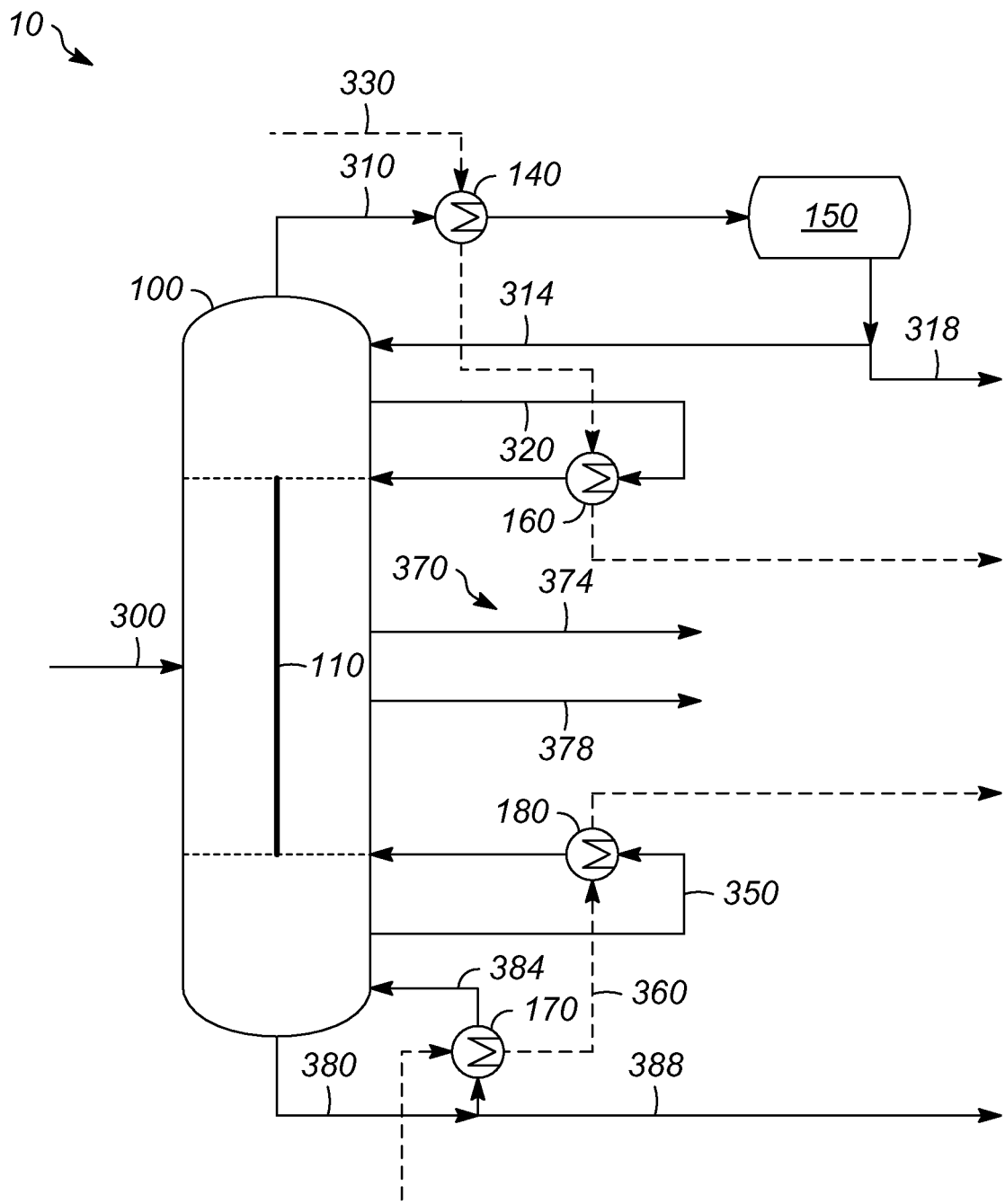
FIG. 2 is a schematic depiction of another exemplary system of a single dividing wall column producing four products.

Another version of the system 10 is depicted in FIG. 2. Particularly, the column 100 can receive a feed 300 and provide an overhead stream 310 including a light naphtha, a plurality of side streams 370, namely a first side stream 374 including a medium naphtha, and second side stream 378 including an aromatic naphtha, and a bottom stream 380 including a heavy naphtha. Generally, the feed 300 can enter the column 100 and into the area defined by the dividing wall 110. The lighter material can rise from the column 100 and exit as the overhead stream 310, pass through the overhead condenser 140 and into the receiver 150. Generally, a portion can be obtained as a light naphtha product 318 with another part returned as a reflux 314. In addition, a side draw 320 can be withdrawn from the column 100, passed through the side condenser 160, and returned. A cooling stream 330 can pass through the overhead condenser 140 and then the side condenser 160 for providing cooling duty. The cooling stream 330 can be any suitable stream, as described above.

The bottom stream 380 can provide a heavy naphtha product 388 with a portion as a return 384. The return 384 can pass through the reboiler 170 before providing heat to the bottom of the column 100. Another side draw 350 can pass through the side reboiler 180 before being returned to the column 100. Typically, the reboiler 170 and the side reboiler 180 receive a heating stream 360. The heating stream 360 can be any suitable stream, as described above. In this manner, one utility stream can provide the requisite cooling duty and another process stream can provide the requisite heating duty for the column 100. This efficient utilization of such process streams can save energy costs.

Figure 3:
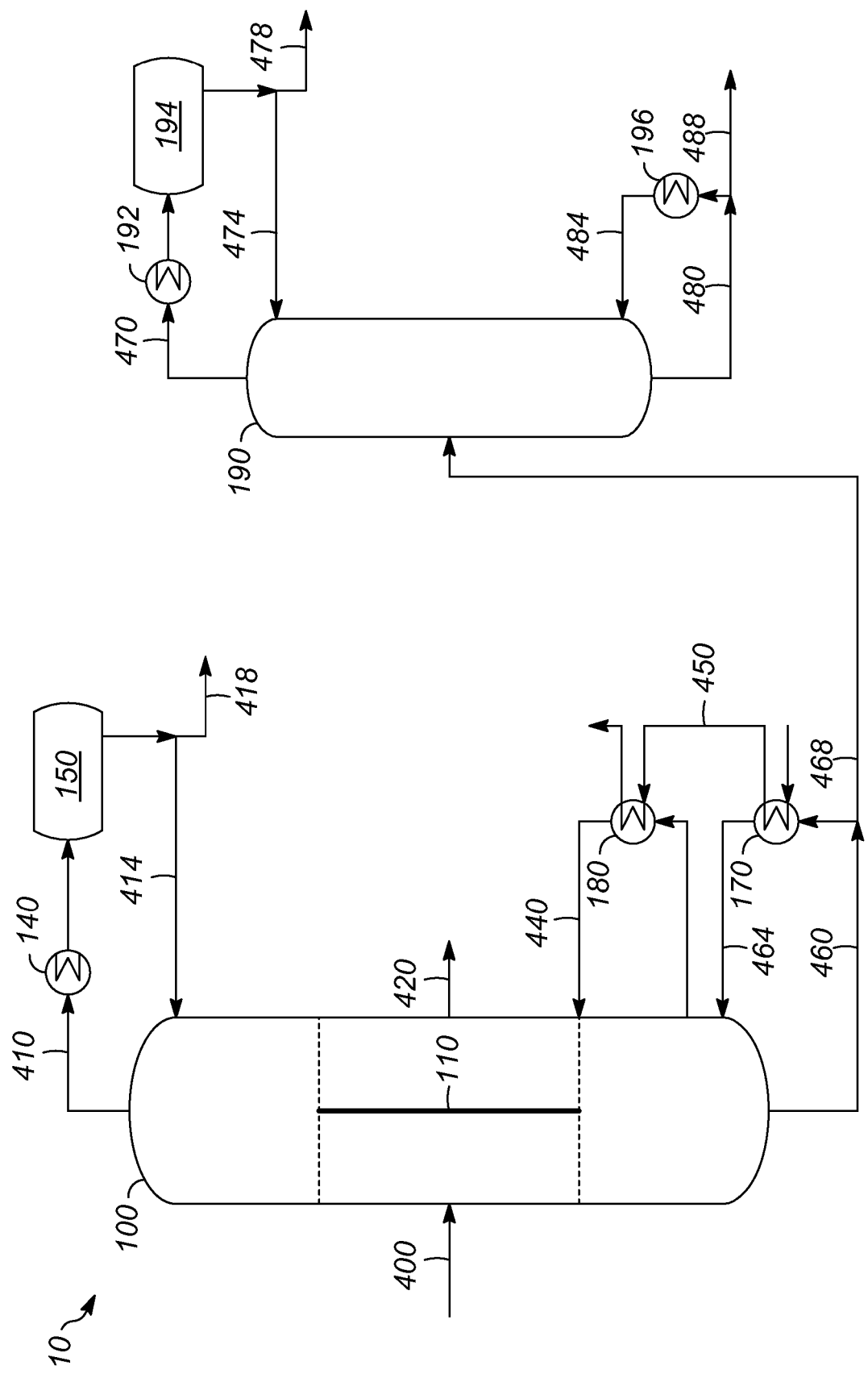
FIG. 3 is a schematic depiction of an exemplary system including a plurality of columns.

Another exemplary version of a system 10 is depicted in FIG. 3. Particularly, the column 100 is placed in series with a non-divided column 190. The non-divided column 190 can include a receiver 194 and a reboiler 196.

Generally, the dividing wall column 100 can receive a feed 400 that may include a plurality of naphtha components. The feed 400 can provide an overhead stream 410 including a light naphtha, a side stream 420 including a middle naphtha, and a bottom stream 460 that can include an aromatic and a heavy naphtha. Generally, as the feed 400 enters the column 100, the lighter material can pass as the overhead stream 410 passing through the overhead condenser 140 and then to the receiver 150. A part can be returned as a reflux 414 and another part may be withdrawn as a light naphtha product 418 from the receiver 150. A part of the bottom stream 460 can be provided as a feed 468 to the second column 190 with another part as a return 464 to the column 100. Generally, the return 464 can pass through the reboiler 170 before entering the column 100. In addition, a side draw 440 can be withdrawn from the column 100, passed through the side reboiler 180, and returned to the column 100. Generally, any suitable heating stream 450, as described above, can be used to first heat the reboiler 170, usually having a higher duty requirement, before being passed to the side reboiler 180. The feed 468 can enter the second column 190. Lighter materials can exit as an overhead stream 470 passing through an overhead condenser 192 before entering the receiver 194. A part can be returned as a reflux 474 with another part withdrawn as an aromatic naphtha product 478. The heavier material in the column 190 can pass out as a bottom stream 480 with a portion taken as a heavy naphtha product 488 and another part as a return 484 to the column 100 which passes through the reboiler 196.

In embodiments discussed above, a single cooling stream can pass in series through the overhead condenser 140 and then the side condenser 160, and/or a single heating stream can pass in series through the reboiler 170 and then the side reboiler 180. Alternatively, cooling streams and/or heating streams may be used separately in parallel. As an example referring to FIG. 1, the system 10 can use separate streams, independently including any suitable fluid, such as air, water or another process stream, to pass through the overhead condenser 140 and the side condenser 160. Similarly, the system 10 can use separate streams, independently including any suitable fluid, such as high pressure steam, medium pressure steam, low pressure steam, or another process fluid, to pass through the reboiler 170 and the side reboiler 180. In one exemplary version, a high pressure steam can provide heat duty to the reboiler 170 and a hot light cycle oil stream can provide heat duty to the side reboiler 180. As such, the amount of high pressure steam, which can be an expensive utility in a refinery or a chemical manufacturing unit as compared to other heat sources, can be reduced.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A system for separating a plurality of naphtha components, comprising:
   a column, comprising:
      a dividing imperforate wall with one surface facing a feed and another surface facing at least one side stream wherein the wall extends a significant portion of the column height to divide the portion into at least two substantially vertical, parallel contacting sections;
      an overhead condenser receiving an overhead stream from the column; and
      a side condenser receiving a process stream from a side draw from the column at a point above the at least one side stream and the dividing imperforate wall and returning the stream to the column to facilitate separation;
   wherein a cooling stream passes through the overhead condenser and then the side condenser.

2. The system according to claim 1, wherein the column further comprising:
   a reboiler receiving at least a portion of a bottom stream and returning that portion to the column; and
   a side reboiler receiving another process stream from the column and returning the another process stream to the column.

3. The system according to claim 2, further comprising a heating stream passing through the reboiler and then the side reboiler.

4. The system according to claim 1, wherein the at least one side stream comprises a first side stream comprising a medium naphtha and a second side stream comprising an aromatic naphtha.

5. The system according to claim 2, wherein the bottom stream comprises a heavy naphtha.

6. The system according to claim 1, wherein the cooling stream comprises cooling water.

7. The system according to claim 3, wherein the heating stream comprises high pressure steam.

8. A system for separating a plurality of naphtha components, comprising:
   a first column, comprising:
      a dividing imperforate wall with one surface facing a feed and another surface facing a side stream wherein the wall extends a significant portion of the column height to divide the portion into at least two substantially vertical, parallel contacting sections;
      a reboiler; and
      a side reboiler receiving a process stream from a side draw from the column at a point below the side stream and below the dividing imperforate wall;
      wherein a heating stream passes through the reboiler and the side reboiler.

9. The system according to claim 8, wherein the heating stream comprises a light cycle oil.

10. The system according to claim 8, wherein the first column further comprises an overhead condenser and a side condenser wherein a cooling stream passes through the overhead condenser and then the side condenser.

11. The system according to claim 10, wherein the cooling stream comprises cooling water.

12. The system according to claim 10, wherein the first column provides an overhead stream comprising a light naphtha.

13. The system according to claim 10, wherein the first column provides a side stream comprising a medium naphtha.

14. The system according to claim 10, further comprising a second column communicating with the first column so as to provide a feed to or receive a feed from the first column wherein the second column is non-divided and provides an overhead stream comprising an aromatic naphtha.

15. The system according to claim 10, further comprising a second column communicating with the first column so as to provide a feed to or receive a feed from the first column wherein the second column is non-divided and provides a bottom stream comprising a heavy naphtha.

16. A system for separating a plurality of naphtha components, comprising:
a first column, comprising:
a dividing imperforate wall with one surface facing a feed and another surface facing a side stream wherein the wall extends a significant portion of the column height to divide the portion into at least two substantially vertical, parallel contacting sections;
an overhead condenser receiving an overhead stream from the column;
a side condenser receiving a process stream from a first side draw from the column at a point above the side stream and returning the stream to the column to facilitate separation;
a reboiler; and
a side reboiler receiving a process stream from a second side draw from the column at a point below the side stream and returning the stream to the column to facilitate separation;
wherein the first side draw is above the second side draw.

17. The system according to claim 16, wherein a heating stream passes through the reboiler and the side reboiler.

18. The system according to claim 16, wherein the first column further comprises an overhead condenser and a side condenser wherein a cooling stream passes through the overhead condenser and then the side condenser.

19. The system according to claim 18, wherein the cooling stream comprises cooling water.

20. The system according to claim 18, wherein the first column provides an overhead stream comprising a light naphtha.

* * * * *